US005165666A

United States Patent [19]

Gerencser

[11] Patent Number: 5,165,666

[45] Date of Patent: Nov. 24, 1992

[54] LAMP FOR VEHICLE LIGHTING SYSTEM

[75] Inventor: Steven E. Gerencser, South Bend, Ind.

[73] Assignee: Hopkins Manufacturing Corporation, Emporia, Kans.

[21] Appl. No.: 702,583

[22] Filed: May 17, 1991

[51] Int. Cl.[5] .......................... B60Q 1/26; H01J 7/44

[52] U.S. Cl. .................................. 362/833; 362/80; 362/211; 315/71; 315/77; 340/431; 340/468; 307/10.8

[58] Field of Search .................. 362/61, 80, 83.3, 211, 362/212; 340/431, 468, 472, 475; 307/10.8; 315/52, 71, 77

[56] References Cited

U.S. PATENT DOCUMENTS

| | | | |
|---|---|---|---|
| 3,349,280 | 10/1967 | Siiberg | 315/77 |
| 3,400,293 | 9/1968 | Reichardt | 307/10.8 |
| 3,638,068 | 1/1972 | Wilson | 315/77 |
| 3,836,814 | 9/1974 | Rodriquez | 315/71 |
| 3,849,664 | 11/1974 | Bryant | 315/77 |
| 4,270,115 | 5/1981 | Bonnett | 340/431 |
| 4,405,190 | 9/1983 | Schroeder | 307/10.8 |
| 4,629,943 | 12/1986 | Ponce, Jr. | 315/71 |
| 4,654,560 | 3/1987 | Cote | 315/200 R |
| 4,751,431 | 6/1988 | Ducote | 315/77 |

*Primary Examiner*—Ira S. Lazarus

*Assistant Examiner*—Y. Quach

*Attorney, Agent, or Firm*—Calfee, Halter & Griswold

[57] ABSTRACT

A lamp provides brake and turn signal functions for a towed vehicle while isolating the electrical lighting system of the towed vehicle from the electrical lighting system of a towing vehicle. The lamp includes a bulb, having an interior cavity, mounted to a bulb base. The bulb base is received in a lamp receptacle on the towed vehicle. The bulb base includes a positive contact region and a negative contact region. The positive and negative contact regions on the bulb base are connected to the electrical lighting system of the towed vehicle. At least one filament having a negative lead and a positive lead is located within the bulb cavity. The negative lead of the filament is connected to the negative contact region of the bulb base, while the positive lead of the filament is connected to both an isolator device and a lead wire. The isolator device is connected to the positive contact region on the bulb base, while the lead wire is connected to the electrical lighting system of the towing vehicle. The isolator device electrically isolates the positive contact region on the bulb base from the lead wire, and hence isolates the electrical lighting system of the towed vehicle from the electrical lighting system of the towing vehicle.

20 Claims, 3 Drawing Sheets

LAMP FOR VEHICLE LIGHTING SYSTEM

TECHNICAL FIELD

A lamp provides brake and turn signal functions for a towed vehicle while isolating the electrical lighting system of the towed vehicle from the electrical lighting system of a towing vehicle.

BACKGROUND OF THE INVENTION

Connector systems are known which interconnect the electrical lighting system of a towing vehicle with the electrical lighting system of a towed vehicle. The connector systems provide appropriate brake, turn signal and running lamp operation for the towed vehicle. The systems differ slightly depending upon the type of towing vehicle used. Some connector systems have an electrical connector interposed within the electrical lighting system of the towing vehicle and coupled to a harness connector system extending between the towing vehicle and the towed vehicle.

In a motor home for example, the factory installs electrical wiring for the electrical lighting system as original equipment. A T-shaped connector can be selectively interposed within the electrical lighting system of the motor home to provide a tap for electrical power to a towed vehicle, such as a small car or truck. For example, a T-shaped connector manufactured by the assignee of the present invention under the trademark LITE MATE Vehicle Connector can be interposed between a male and female plug in the electrical lighting system of the towing vehicle. The T-shaped connector has a plug-in tap connection configured to receive one end of a harness manufactured by the assignee under the trademark LITE MATE Trailer Connector. The LITE MATE Trailer Connector has a plug-in connector to receive a LITE MATE Wiring Harness. The harness extends along the length of the towed vehicle and has a plug-in connector to receive a LITE MATE Split Wire Vehicle Connector. The vehicle connector can be wired at its other end directly to the filaments in the brake, turn signal and running lamps on the towed vehicle.

The connector system thereby connects the electrical lighting system of the towing vehicle directly with the brake, turn signal and running lamps on the towed vehicle. The lamps on the towed vehicle, however, are also integrally connected within the electrical lighting system of the towed vehicle. Accordingly, electrical signals from the towing vehicle, in the form of electrical feedback, can be applied to the electrical lighting system of the towed vehicle if the systems are not properly isolated, particularly through the turn signal switching elements in the towed vehicle. This feedback can produce unwanted results in the towed vehicle, such as simultaneous illumination of all turn signal lights in the towed vehicle when only the left or right turn signal light on the towing vehicle is illuminated.

Certain types of feedback-preventing circuits for vehicles have been developed, such as is shown in U.S. patent application Ser. No. 07/579,151, filed Sep. 6, 1990, and assigned to the assignee of the present invention. The '151 application shows an adaptor circuit interposed between the electrical lighting system of the towing vehicle and the electrical lighting system of the towed vehicle. The adaptor circuit includes complimentary metal oxide semiconductor (CMOS) exclusive OR integrated circuits (IC) for providing logic functions for the brake and turn signal lights, and an isolation network comprising a series of LED's and phototransistors for preventing feedback to the electrical lighting system of the towing vehicle. However, this circuit is primarily designed to protect the towing vehicle from feedback from a towed vehicle, and is not designed to isolate the turn signal switching elements in a towed vehicle from feedback from a towing vehicle.

Other types of feedback-preventing circuits have been developed, such as an isolator block hard-wired within the electrical lighting system of the towed vehicle to prevent feedback. However, such hard-wiring of an isolation block requires selecting the correct wires in the towed vehicle, cutting these wires, and making appropriate electrical splices and/or connections. This hard-wiring can be inconvenient, time consuming, and requires care and experience in connecting the isolation block within the electrical system of the towed vehicle.

SUMMARY OF THE INVENTION

The present invention relates to a new and useful lamp which provides brake and turn signal functions for a towed vehicle while isolating the electrical lighting system of the towed vehicle from the electrical lighting system of a towing vehicle. The lamp includes a bulb, having an interior cavity, mounted to a bulb base. The bulb base includes a positive contact region and a negative contact region. The bulb base is received in a lamp receptacle on the towed vehicle. The lamp receptacle has corresponding positive and negative contact regions which are connected to the electrical lighting system of the towed vehicle.

At least one filament is located within the bulb cavity. The filament has a negative lead and a positive lead. The negative lead of the filament is connected to the negative contact region of the bulb base. The positive lead of the filament is connected to both an isolator device and to a lead wire electrically connected to the electrical lighting system of the towing vehicle.

The isolator device comprises at least one diode connected between the positive lead of the filament and the positive contact region on the bulb base. The isolator device is adapted to electrically isolate the positive contact region on the base from the lead wire of the towing vehicle. Accordingly, when the lamp base is mounted within the lamp receptacle in the towed vehicle, the lamp isolates the electrical lighting system of the towed vehicle from the electrical lighting system of the towing vehicle.

One feature of the present invention is to provide a device which prevents feedback from the electrical lighting system of the towing vehicle from being applied to the turn signal switching elements in the electrical lighting system of the towed vehicle.

Another feature of the present invention is to provide a feedback-preventing device which is simple and convenient to install within the electrical lighting system of a towed vehicle without cutting or splicing the original equipment wiring in the towed vehicle.

Still another feature of the present invention is to provide a feedback-preventing lamp which is selectively illuminated from both the electrical lighting system of the towing vehicle and the electrical lighting system of the towed vehicle.

A further feature of the invention is to provide an apparatus which is compatible with vehicles having a 12-volt negative ground electrical system, and which is highly reliable and cost-effective.

These and other features and advantages of the invention will become apparent to those skilled in the art from the following detailed description and the accompanying drawings.

DESCRIPTION OF THE PREFERRED EMBODIMENT

Figure 1:
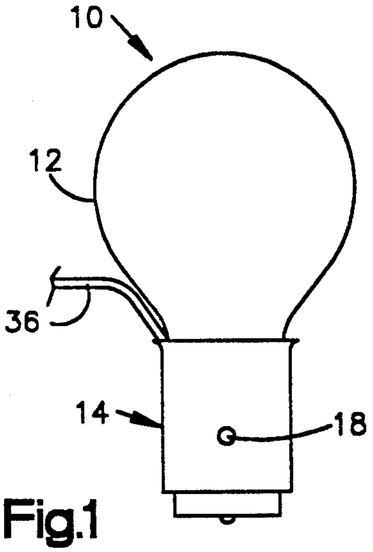
FIG. 1 is an elevation of a first embodiment of a lamp made according to the invention.
Figure 2:
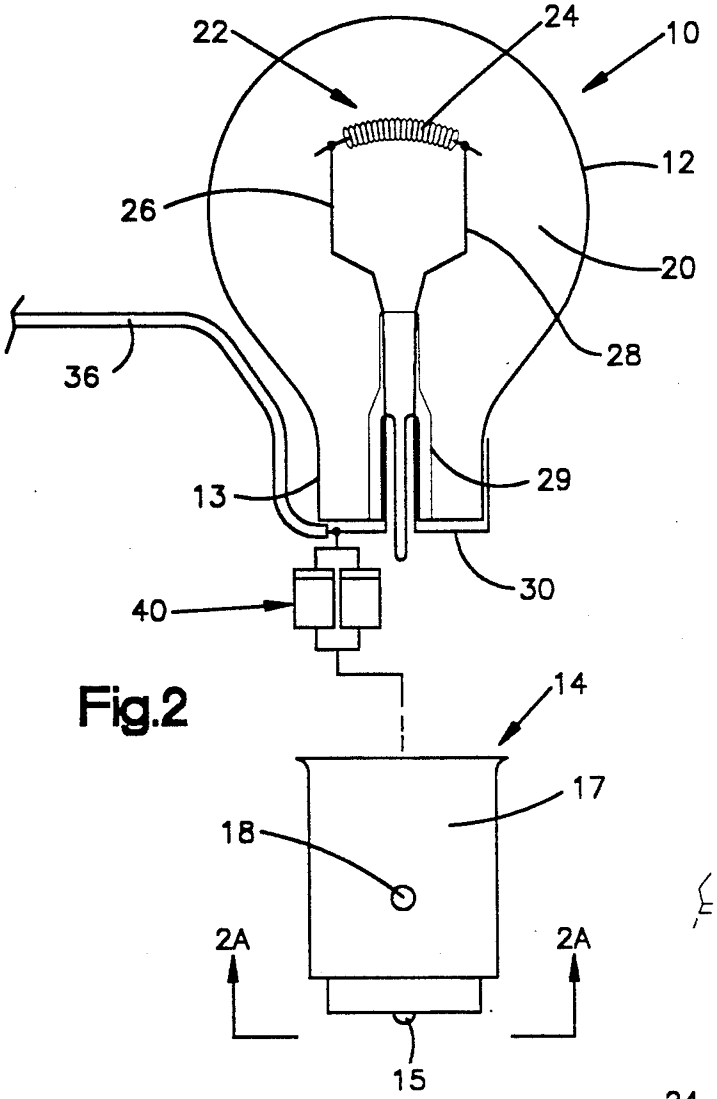
FIG. 2 is a schematic illustration of the lamp of FIG. 1 showing the bulb and base components prior to final assembly.

Referring to the drawings, and initially to FIGS. 1 and 2, a lamp, indicated generally at 10, provides brake and turn signal functions for a towed vehicle such as a small car or truck, while electrically isolating the electrical lighting system of the towed vehicle from the electrical lighting system of a towing vehicle, such as a motor home. The lamp 10 includes a substantially spherical bulb 12 having an annular neck 13. The annular neck 13 is configured to be mounted and secured within a base 14, using conventional techniques known to those skilled in the art, such as by applying a bead of basing cement between the neck of the bulb and the base.

Figure 2A:
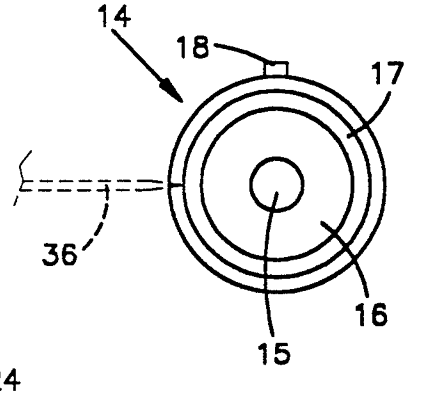
FIG. 2A is a bottom plan view of the bulb base taken substantially along the plane described by the lines 2A—2A of FIG. 2.

The base 14 is a substantially cup-shaped member formed from appropriate material. The base 14 is preferably manufactured by General Electric, Model No. 1103-25, and includes a positive contact region 15 on the bottom 16 of the bulb base (FIG. 2A); and a negative contact region 17, i.e., the side of the bulb base. The bulb base is configured to be received within a conventional lamp receptacle (not shown). To this end, the base 14 includes a pin 18 projecting outwardly therefrom which is adapted to be received in a corresponding locator slot in the lamp receptacle. The lamp receptacle is preferably included within a 12-volt negative-grounded electrical system of the towed vehicle, as is known to those in the art.

The spherical bulb 12 forms an interior cavity 20 which encloses a single filament for example as indicated generally at 22. The spherical bulb 12 is preferably manufactured by General Electric, Model No. 2144, and includes a filament 22 having a tightly wound coil 24 of appropriate material, e.g., tantalum or tungsten. The as of electricity through the filament heats the tightly wound coil 24 white hot to thereby illuminate the surrounding area. The spherical bulb 12 contains an inert gas (not shown) to prevent the tightly wound coil 24 from combining with oxygen in the air to thereby reduce the life of the filament.

The filament 22 further includes a positive lead 26 and a negative lead 28 which extend outwardly from opposite ends thereof through conventional bulb structure 29, e.g., glass. The bulb structure 29 seals the mouth 30 of the bulb and forms an air-tight cavity for the filament. The negative lead 28 of the filament extends through the bulb structure 29 and is electrically connected, e.g., soldered, to the negative contact region 17 on the side of the base 14.

The lamp receptacle (not shown) includes positive and negative contact regions which correspond to the positive and negative contact regions on the bulb base, as is well known to those in the art. The positive and negative contact regions in the lamp receptacle are incorporated into the electrical lighting system of the towed vehicle. In particular, the positive contact region 15 (FIG. 2A) on the bulb base is connected to a DC voltage source such as a conventional 12-volt battery; while the negative contact region 17 on the bulb base is connected to a common ground. The filament 22 in lamp 10 is selectively illuminated by electrical signals received from the electrical lighting system of the towed vehicle to provide conventional brake and/or turn signal functions.

Figure 3:
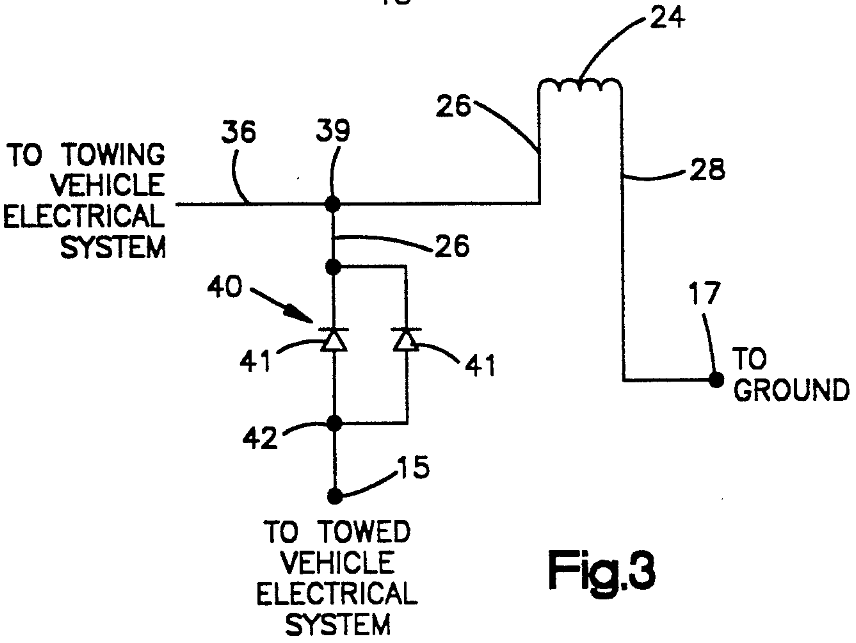
FIG. 3 is a partial circuit diagram of the first embodiment of the invention.
Figure 4:
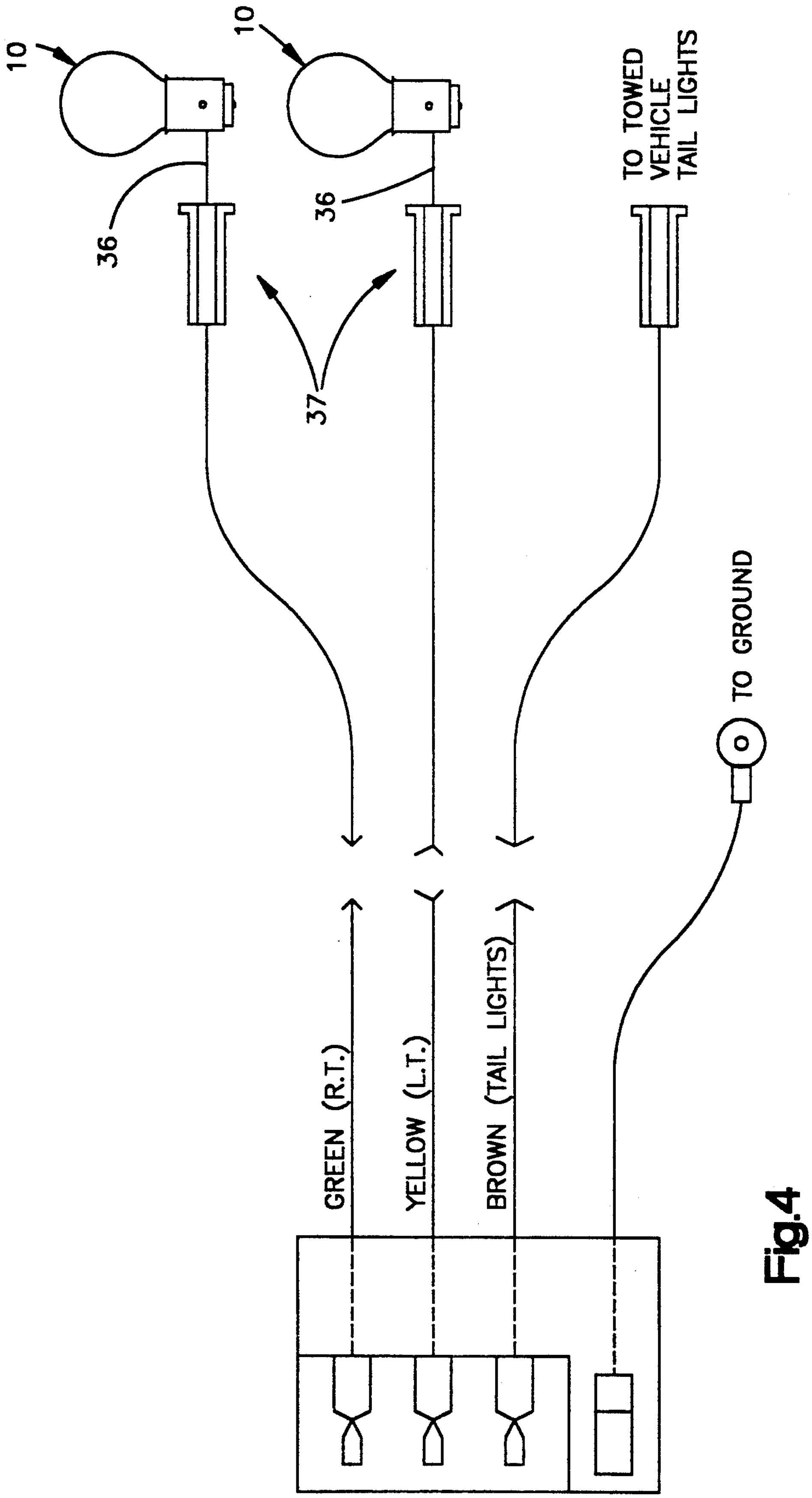
FIG. 4 is a schematic illustration of the electrical connection apparatus connected between the right and left lamps and tail lights in the towed vehicle and the electrical system in the towing vehicle.

In order to selectively operate the lamp 10 from the electrical lighting system of a towing vehicle, a lead wire or conductor 36 is electrically connected between the electrical lighting system of the towing vehicle and the brake and turn signal lamp 10. To this end, the lead wire 36 is connected at 39 to the positive lead 26 of the filament 22 as illustrated in FIGS. 2 and 3. The lead wire 36 extends outwardly from the mouth 30 of spherical bulb 12, passes between the bulb neck 13 and inner diameter of the bulb base, and extends to the towing vehicle. The lead wire 36 is connected to the electrical lighting system of the towing vehicle through, for example, a SLIP CLIP TM Connector (indicated generally at 37 in FIG. 4), manufactured by the assignee of the present invention. Accordingly, electrical signals provided by the electrical lighting system of the towing vehicle will be applied to the filament 22 in the lamp 10 to provide selected illumination.

To prevent electrical signals from the electrical lighting system of the towing vehicle from being applied to the electrical lighting system of the towed vehicle, an isolator device, indicated generally at 40, is integrally connected between the positive lead 26 of the filament 22 and the positive contact region 15 (FIG. 1A) of the base 14.

In the electrical circuitry of the first embodiment as shown in FIG. 3, the isolator device 40 prevents current from flowing from the lead wire 36 to the positive contact region 15 of the bulb base, but allows current to flow in the opposite direction, i.e., from the positive contact region 15 of the bulb base to the filament 22. The isolator device 40 is preferably sized to be received within the base 14, which allows the lamp and the preassembled isolator device to be easily and quickly installed in the lamp receptacle without special tools or electrical connections.

Preferably, the isolator device 40 comprises a plurality of diodes cumulatively equaling ½ watt in value (e.g., two ¼ diodes 41 connected in parallel), however other electrical devices are also within the scope of this invention e.g., a single diode. A preferred pair of ¼ watt diodes are manufactured by Bell Industries, Model No. IN4001. The diodes are selected to provide sufficient isolation of the electrical lighting system of the towed vehicle, and in particular isolation of the turn signal switching elements of the towed vehicle, yet allow sufficient illumination of the filament from electrical signals received from the towed vehicle. The diodes can be connected together e.g., soldered, as indicated at 42. The lead wire 36 can be connected to or include additional circuitry which prevents electrical feedback from being applied from the electrical lighting system of the towed vehicle to the electrical lighting system of the towing vehicle.

Accordingly, the present invention provides a simple, yet unique method of isolating the electrical lighting system of the towed vehicle from the electrical lighting system of the towing vehicle; and in particular, of isolating the turn signal switching elements of the towed vehicle from the electrical lighting system in the towing vehicle. The isolator device prevents feedback to the electrical lighting system of the towed vehicle, yet allows electrical signals from the towed vehicle to selectively illuminate the lamp for conventional brake and/or turn signal functions.

Figure 5:
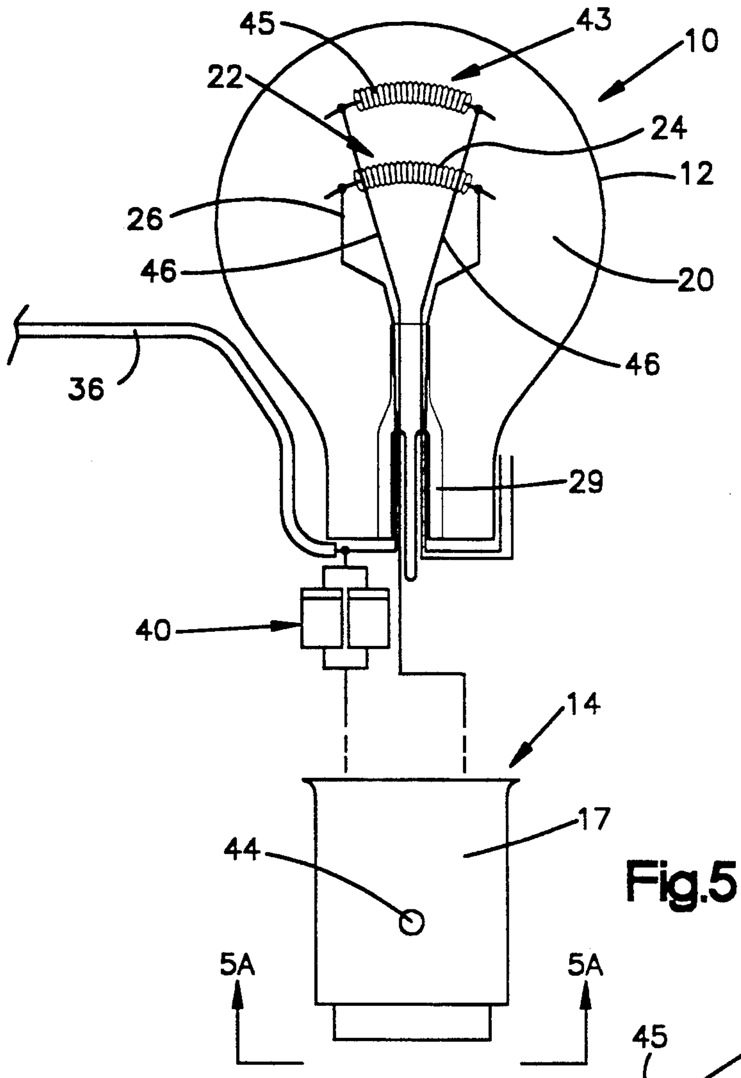
FIG. 5 is a schematic exploded illustration of a second embodiment of the lamp showing the bulb and base components prior to final assembly.
Figure 5A:
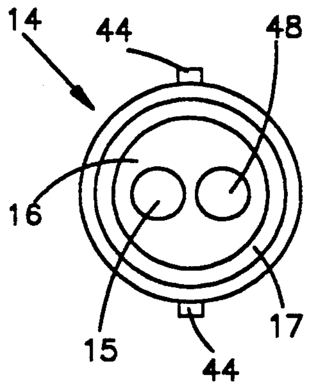
FIG. 5A is a bottom plan view of the bulb base taken substantially along the plane described by the lines 5A—5A of FIG. 5.
Figure 6:
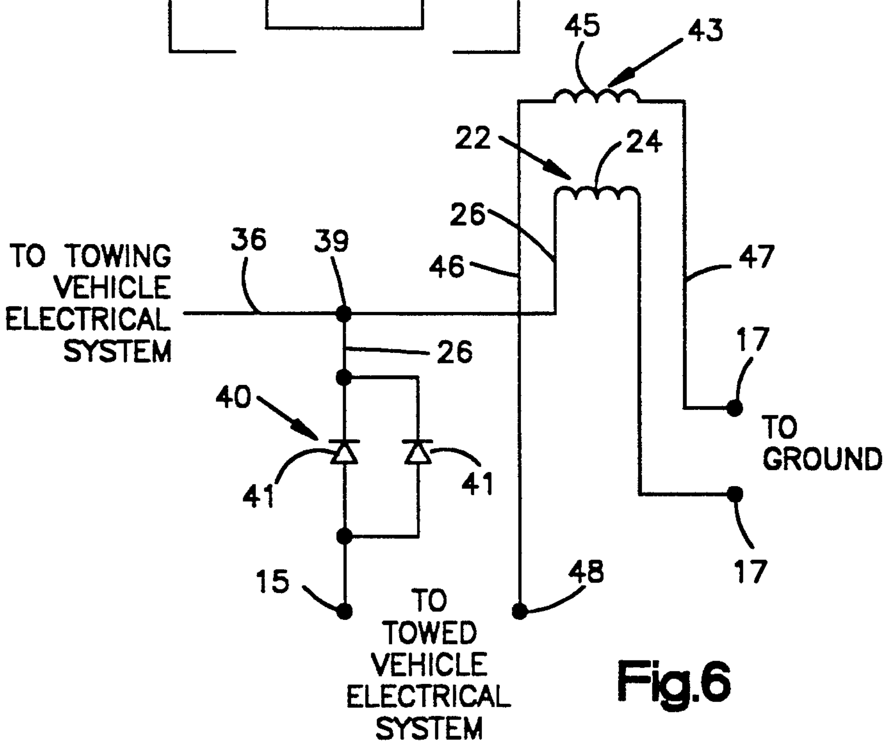
FIG. 6 is a partial circuit diagram of the second embodiment of the invention.

According to another embodiment of the present invention, as illustrated in FIGS. 5, 5A and 6, the lamp 10 can have a second filament, indicated generally at 43, located within the bulb cavity 20. For simplicity and clarity of understanding, the same reference numerals will be used to describe the lamp as were used in the first embodiment. The choice between a single or dual-filament lamp depends on the particular design of the electrical lighting system of the towed vehicle. In any case, it is conventional that the first filament 22 provides the brake and turn signal functions, while the second filament 43 provides the running light function.

In the second embodiment, the dual-filament lamp is preferably manufactured by Wagner, Model No. 2242D1, while the base is preferably manufactured by General Electric, Model No. 100413. The base for the dual-filament lamp includes a pair of diametrically-opposed pins 44, which are adapted to be received in corresponding diametrically-opposed locator slots in a lamp receptacle (not shown).

The second filament 43 is electrically connected within the electrical lighting system of the towed vehicle using conventional techniques. In particular, as illustrated in FIGS. 5 and 6, the second filament 43 includes a tightly wound coil 45 having a positive lead 46 and a negative lead 47 which extend through the bulb structure 29 and are connected to the base 14. Specifically, the positive lead 46 is connected, e.g., soldered, to a second positive contact region 48 (FIG. 5A) on the bottom of the base 14 adjacent the first positive contact region 15. The negative lead 47 is connected, e.g., soldered, to the negative contact region 17 on the side of the base 14, as in the first embodiment. The lamp receptacle for the base 14 includes corresponding positive and negative contact regions incorporated within the electrical lighting system of the towed vehicle.

To illuminate the second filament 43, the electrical lighting system of the towing vehicle can be electrically connected to the electrical lighting system of the towed vehicle, such as by tapping into the towed vehicle wiring system using a SLIP CLIP™ Connector, and in particular into the portion of the wiring system which is connected to the running lights in the towed vehicle. Since all the running lights on a towed vehicle are typically illuminated when the running lights on the towing vehicle are illuminated, an isolator device is normally not necessary with the second filament.

Accordingly, in either of these two embodiments, the lamp 10 provides a convenient, yet effective device for isolating the electrical lighting system of the towed vehicle from the electrical lighting system of the towing vehicle; and in particular for isolating the turn signal switching elements in the towed vehicle from the electrical lighting system of the towing vehicle. The device is simple and convenient to install, yet does not require invasion of the electrical lighting system of either the towed or towing vehicle.

Although the invention has been shown and described with respect to a certain preferred embodiment, it is obvious that equivalent alterations and modifications will occur to others skilled in the art upon their reading and understanding of the specification. The present invention includes all such equivalent alterations and modifications, and is limited only by the scope of the following claims.

What is claimed is:

1. A lamp, comprising:

a bulb having an interior cavity, said bulb being mounted to a bulb base having a positive contact region and a negative contact region, a light source located within said bulb cavity, said light source including a negative lead and a positive lead, said negative lead being connected to the negative contact region of said bulb base, and said positive lead being connected to the positive contact region of said bulb base, a wire leading from a remote voltage source to a connection with said positive lead, and an isolator means connected between said positive lead and said positive contact region of said bulb base, said isolator means adapted to electrically isolate the positive contact region of said bulb base from the remote voltage source.

2. A lamp as in claim 1, wherein said isolator means includes at least one diode.

3. A lamp as in claim 2, wherein said isolator means includes a pair of diodes.

4. A lamp as in claim 3, wherein said light source includes a first filament.

5. A lamp as in claim 4, wherein said light source further includes a second filament, said second filament also including a positive and negative lead, said positive lead of said second filament being connected to a second positive contact region of said bulb base, and said negative lead of said second filament being connected to the negative contact region of said bulb base.

6. A lamp, comprising:

a bulb having an interior cavity, said bulb being mounted to a bulb base having a positive contact region and a negative contact region, a light source located within said bulb cavity, said light source including a negative lead and a positive lead, said negative lead being connected to the negative contact region of said bulb base, and said positive lead being connected to the positive contact region of said bulb base, said positive lead also being adapted to be connected to a remote voltage source, an isolator device connected between said lead and said positive contact region of said bulb base, said isolator device adapted to electrically isolate said positive contact region of said bulb base from the remote voltage source.

7. A lamp as in claim 6, wherein said isolator device includes at least one diode.

8. A lamp as in claim 7, wherein said isolator device includes a pair of diodes.

9. A lamp as in claim 8, wherein said light source includes a first filament.

10. A lamp as in claim 9, wherein said light source further includes a second filament, said second filament also including a positive and negative lead, said positive lead of said second filament being connected to a second positive contact region of said bulb base, and said negative lead of said second filament being connected to the negative contact region of said bulb base.

11. A lamp as in claim 10, wherein said isolator device is connected between said positive lead and said positive contact region of said bulb base.

12. An apparatus for electrically isolating an electrical lighting system of a towed vehicle from an electrical lighting system of a towing vehicle, comprising:

a bulb having an interior cavity mounted to a bulb base, a light source located within said bulb cavity, said light source being electrically connected to the electrical lighting system of the towing vehicle, said light source also being electrically connected to the electrical lighting system of the towed vehicle through an isolator device, said isolator device at least partially located within said bulb base and electrically isolating the electrical lighting system of the towed vehicle from the electrical lighting system of the towing vehicle.

13. An apparatus as in claim 12, wherein said isolator device includes at least one diode.

14. An apparatus as in claim 13, wherein said isolator device includes a pair of diodes.

15. An apparatus as in claim 14, wherein said light source includes a first filament.

16. A lamp having a bulb with an interior cavity, said bulb being mounted to a bulb base, a light source located within said bulb cavity having a negative lead adapted to be connected to a common ground and a positive lead adapted to be connected to a first remote voltage source and to a second remote voltage source, an improvement comprising an isolator device located at least partially within said bulb base and connected between said positive lead and said first remote voltage source to electrically isolate said first remote voltage source from said second remote voltage source.

17. A lamp as in claim 16, wherein said isolator device includes at least one diode.

18. A lamp as in claim 17, wherein said isolator device includes a pair of diodes.

19. A lamp as in claim 18, wherein said light source includes a first filament.

20. A lamp as in claim 19, wherein said light source further includes a second filament, said second filament also including a positive and negative lead, said positive lead of said second filament adapted to be connected to the second remote voltage source, and said negative lead of said second filament adapted to be connected to the common ground.

* * * * *